Figure 3:
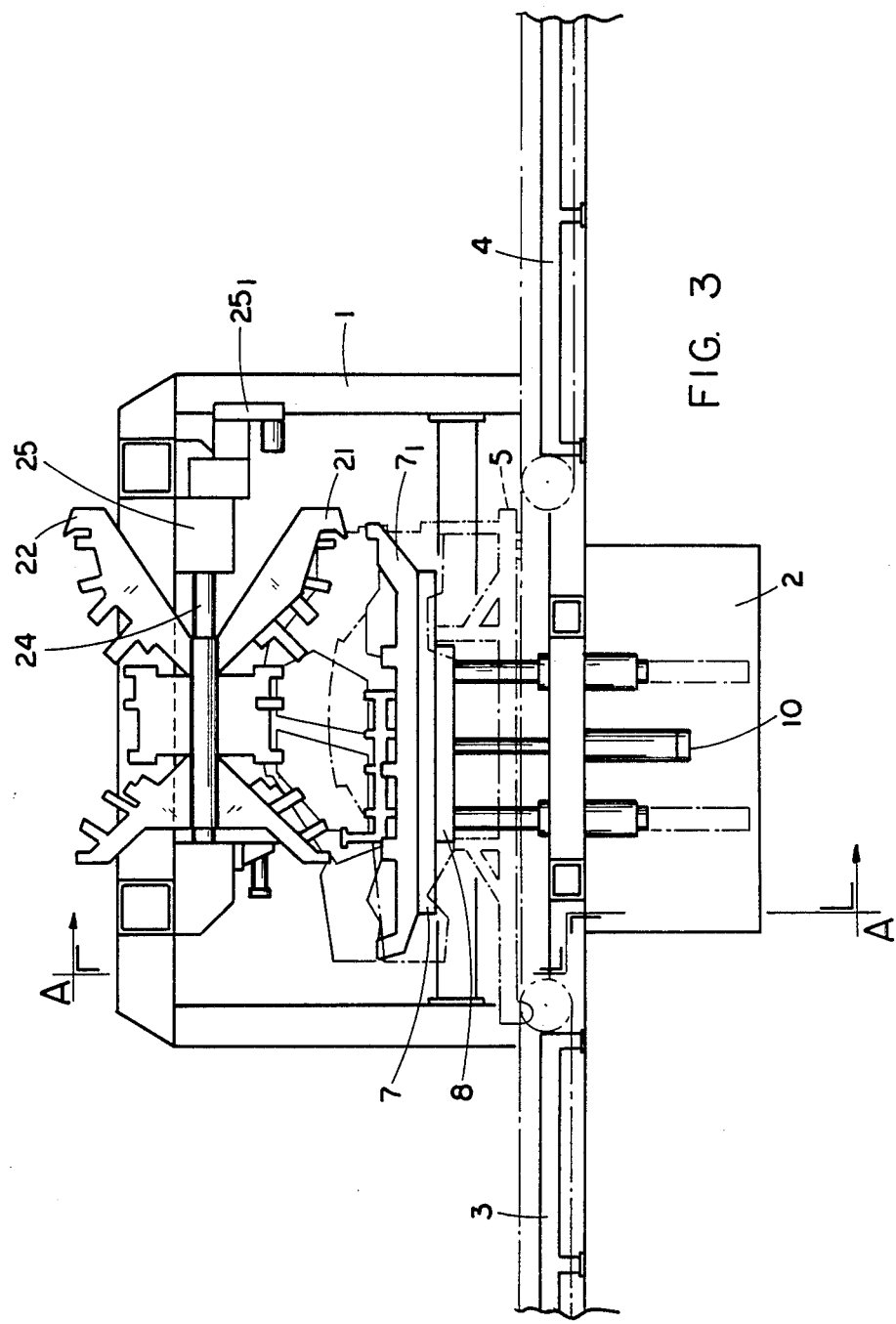

United States Patent [19]

Sciaky et al.

[11] Patent Number: 4,675,969

[45] Date of Patent: Jun. 30, 1987

[54] INSTALLATION FOR ASSEMBLING A NUMBER OF BODY MODELS OF A SINGLE TYPE OF MOTOR VEHICLE

[75] Inventors: Mario Sciaky, Paris; Pierre Jablonski, Creteil; Jean-Jacques Marianne, Combs La Ville; Michel Leonard, Maisons Alfort, all of France

[73] Assignee: Sciaky S.A., Vitry, France

[21] Appl. No.: 736,358

[22] Filed: May 21, 1985

[30] Foreign Application Priority Data

May 23, 1984 [FR] France ................. 84 08066

[51] Int. Cl.⁴ ............................ B25B 27/14
[52] U.S. Cl. ............................ 29/281.4; 901/7
[58] Field of Search ............ 901/7; 414/736; 29/281.1, 281.4; 269/279, 56, 58; 228/47, 49 R, 44.1

[56] References Cited

U.S. PATENT DOCUMENTS

| 1,531,377 | 3/1925 | Clarke | 269/279 |
| 4,532,148 | 7/1985 | Vecellio | 901/7 |
| 4,556,361 | 12/1985 | Bartlette et al. | 901/7 |

FOREIGN PATENT DOCUMENTS 2405024  8/1975  Fed. Rep. of Germany .......... 901/7

Primary Examiner—Robert C. Watson
Attorney, Agent, or Firm—Clifford A. Poff

[57] ABSTRACT

Installation for assembling a number of body models of a single type of motor vehicle. The installation includes: a horizontal shaft at the top of the frame for moving vertically the assemblies of elements used to position and hold components of the top part of a given motor vehicle body model while welding the components.

3 Claims, 4 Drawing Figures

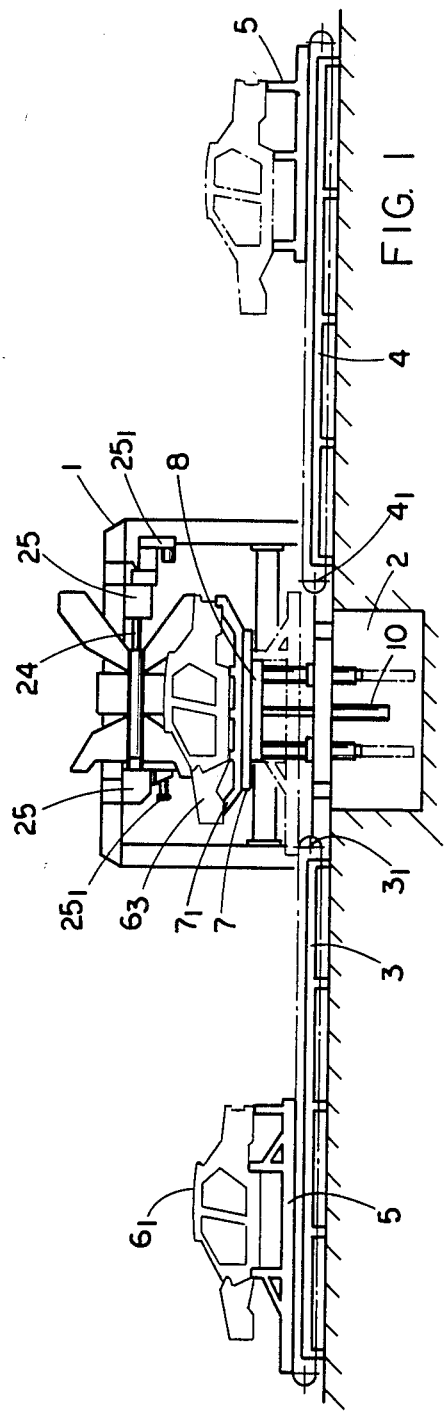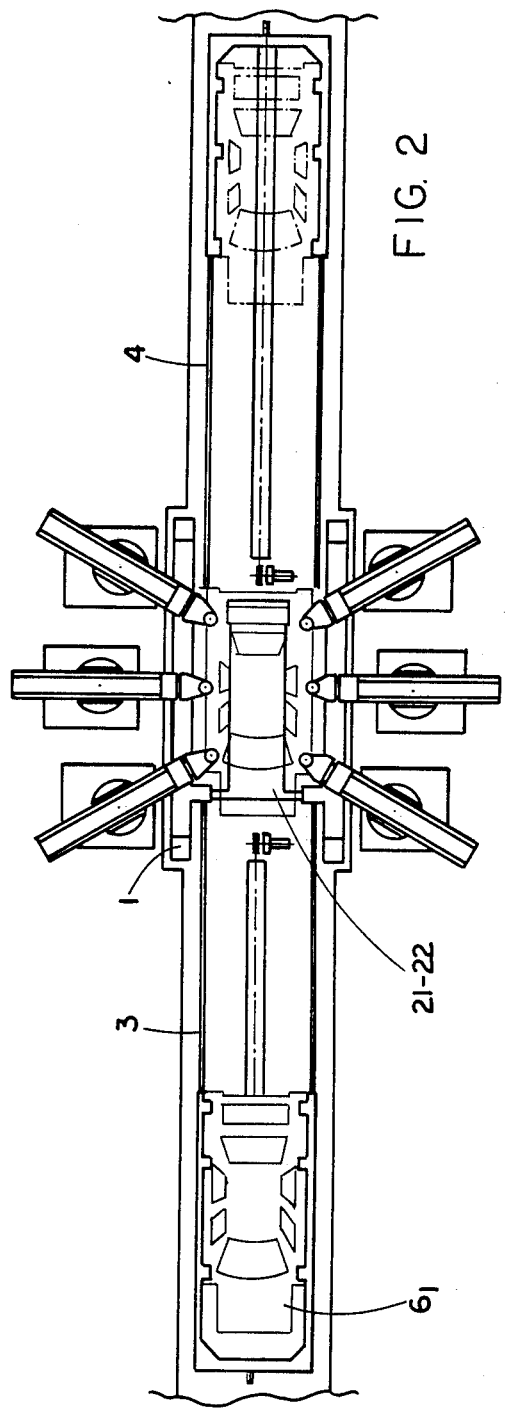

INSTALLATION FOR ASSEMBLING A NUMBER OF BODY MODELS OF A SINGLE TYPE OF MOTOR VEHICLE

The invention relates to an installation for assembling a number of body models of a single type of motor vehicle.

As disclosed in French Patent Publication No. 2 555 092, published July 19, 1985, the applicants have already designed an installation of the kind for assembling a number of body models of a single type of motor vehicle, i.e. the bodies have numerous common components at the bottom, such as the floor, the front unit, the rear unit and the bottom parts of the side panels, whereas the top parts such as the horn, the front window and the back window differ from one body model to another.

In the known installation, bodies carried by bottom slides are brought into a fixed frame where they are raised by a lift. In the top position, positioning and holding means engage the top parts of the body, so that it is properly positioned and held for the welding means to make the required welds.

The various positioning and holding elements, each corresponding to a body model, are movable along horizontal tracks in the top part of the rigid frame, the horizontal tracks being parallel to the tracks for the bottom slides.

The known installation has the advantage of having a simple construction and not posing problems of adaptation to the tools for the various models of a given type of body.

The invention aims to improve the known installation by further increasing the speed and accuracy with which the elements for positioning and holding the top part of one body model are replaced by the elements for another model.

To this end, the installation comprises a fixed rigid frame having means at its top for moving a number of assemblies, each assembly comprising elements for positioning and holding components of the top part of a given motor-vehicle body model whereas at the bottom of the frame there is a lift receiving centring means co-operating with the components of the bottom part of a type of vehicle body common to a number of models, the lift being movable between two positions (a) a bottom position at which the lift is disposed between a track for supplying bodies for welding and a track for discharging bodies after welding, the tracks being used for moving slides or "bottom slides" carrying the body and (b) a top position at which the body of one vehicle mode engages one of the assemblies of means for positioning and holding the corresponding model of the vehicle on the lift, the installation being characterised in that the means at the top of the frame for moving the assemblies of elements for positioning and holding the components of the top part of a given motor vehicle body model, is constructed so as to move the assemblies vertically.

According to another feature of the invention, by means for vertically moving the assemblies comprises a horizontal pivoting shaft for moving vertically in a circle.

According to another feature, the pivoting shaft is parallel to the tracks along which the bottom slides move.

Figure 4:
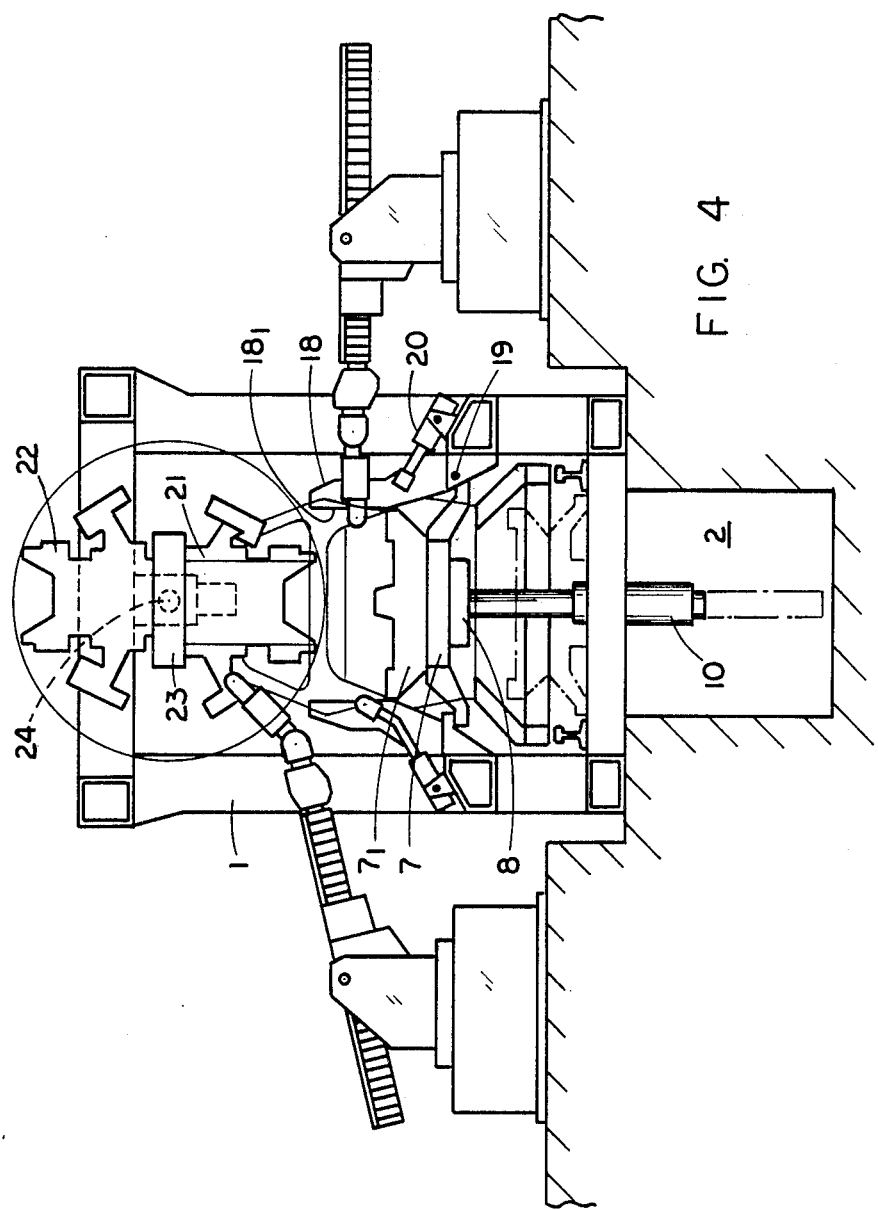

The invention is shown by way of non-limitative examples in the accompanying drawings in which:

FIG. 1 is a diagrammatc side view of an installation according to the invention;
FIG. 2 is a top view of FIG. 1;
FIG. 3 is an enlarged view of the frame in FIG. 1, and
FIG. 4 is a section along A—A in FIG. 3.

The installation comprises a fixed rigid frame 1 disposed above a pit 2 and between a track 3 for supplying bodies for welding and a track 4 for discharging the bodies after welding.

The bodies, which are for a single type of vehicle but different models, are carried on aligned tracks 3, 4 by bottom slides 5 driven by motors $3_1$ and $4_1$ respectively. Bodies $6_1$ for assembling and carried by bottom slides 5 which are identical for all body models for this type of vehicle, are brought inside frame 1 at the top of a lift 8 actuated by a jack 10 and having a table 7. The table bears centring means $7_1$ comprising studs which engage corresponding orifices in parts of the body underframe which are common to all body models for a given type of vehicle. Means $7_1$ are disposed on table 7 so as to engage means $5_1$ for positioning and holding slides 5, which are successively brought on top of table 7 via track 3.

When the lift is in the bottom position, table 7 is disposed in line with tracks 3 and 4 so that a slide 5 bearing a car body can be positioned above the positioning means $7_1$. When lift 8 is brought to the top position, the lifted body is in the piercing welding position $6_3$ and is engaged by two types of positioning and holding means. One type is common to all body models and comprises flaps 18 pivoted by jacks 20 on two shafts 19 of frame 1. Flaps 18 comprise elements for positioning the bottom parts of the side panels $18_1$ and are thus common to all models.

The other type of positioning and holding means are interchangeable and can be replaced on each occasion to match the body model to be welded. In the example shown, the means comprise two assemblies 21, 22 of positioning and holding means mounted on either side of a support 23 at the top part of frame 1, support 23 being pivotably mounted on a horizontal shaft 24 borne by bearings 25 and driven by means $25_1$.

Support 23 and assemblies 21, 22 form a turret having its axis parallel to the bottom tracks 3, 4 so that when support 23 rotates, assemblies 21 and 22 move in a circle in a vertical plane.

In order to change from one to another set of elements for positioning and holding a body model, it is only necessary to pivot support 23 through 180°, an operation which can be done quickly and with high accuracy so as accurately to adapt to the body, which is brought to the top position by lift 8.

When a body has been welded, the actuated positioning and holding means 21, 22 are moved apart and lift 8 is lowered so as to place the body on a slide 5, which is discharged along track 4.

We claim:
1. An installation for assembling a number of body models for a single type of motor vehicle, the installation comprising the combination of a fixed rigid frame having means at its top for moving a number of assemblies, each assembly comprising elements for positioning and holding components of the top part of a given motor-vehicle body model, a lift at the bottom of said frame for receiving centering means co-operating with the components of a bottom part of a type of vehicle body common to a number of models, the lift being movable between two positions comprising a bottom position wherein the lift is disposed between a supply track for supplying bodies for welding and discharge track for discharging bodies after welding, the tracks being used for moving slides carrying a body for a motor vehicle and a top position wherein the body of one vehicle model engages one of the assemblies of means for positioning and holding the corresponding model of the vehicle on the lift means at the top of said fixed rigid frame for vertically moving said assemblies and hold the components of the top part of a given motor vehicle body model during welding to a body.

2. An installation according to claim 1, wherein said means for vertically moving the assemblies comprises a horizontal pivoting shaft for vertically moving said assemblies in a circle.

3. An installation according to claim 2, wherein said pivoting shaft is parallel to said tracks along which said bottom slides move.

* * * * *